N. S. CHAPMAN.
SPRING MOTOR FAN.
APPLICATION FILED DEC. 19, 1919.
1,365,455.
Patented Jan. 11, 1921.
2 SHEETS—SHEET 2.
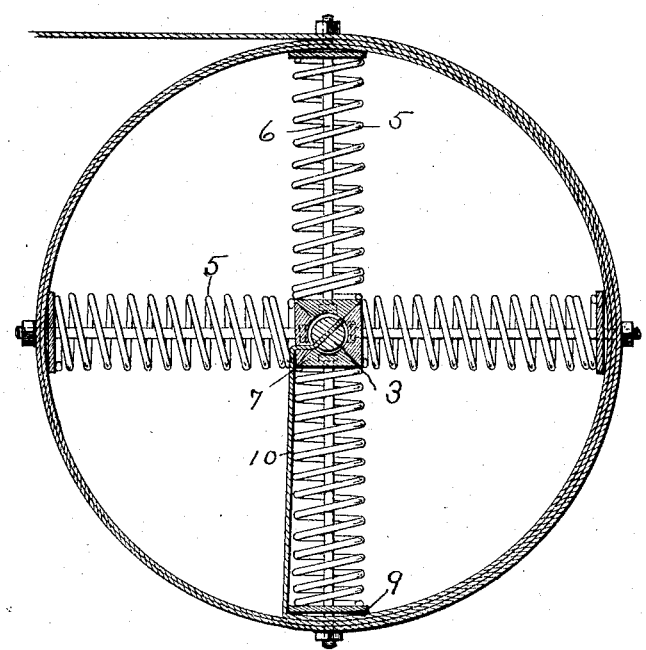
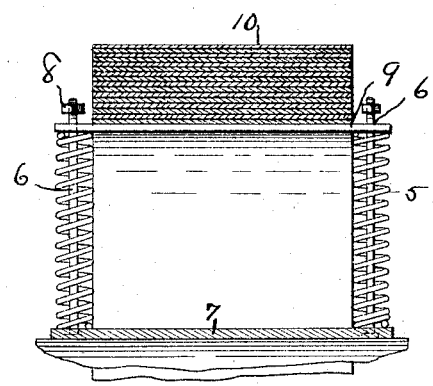

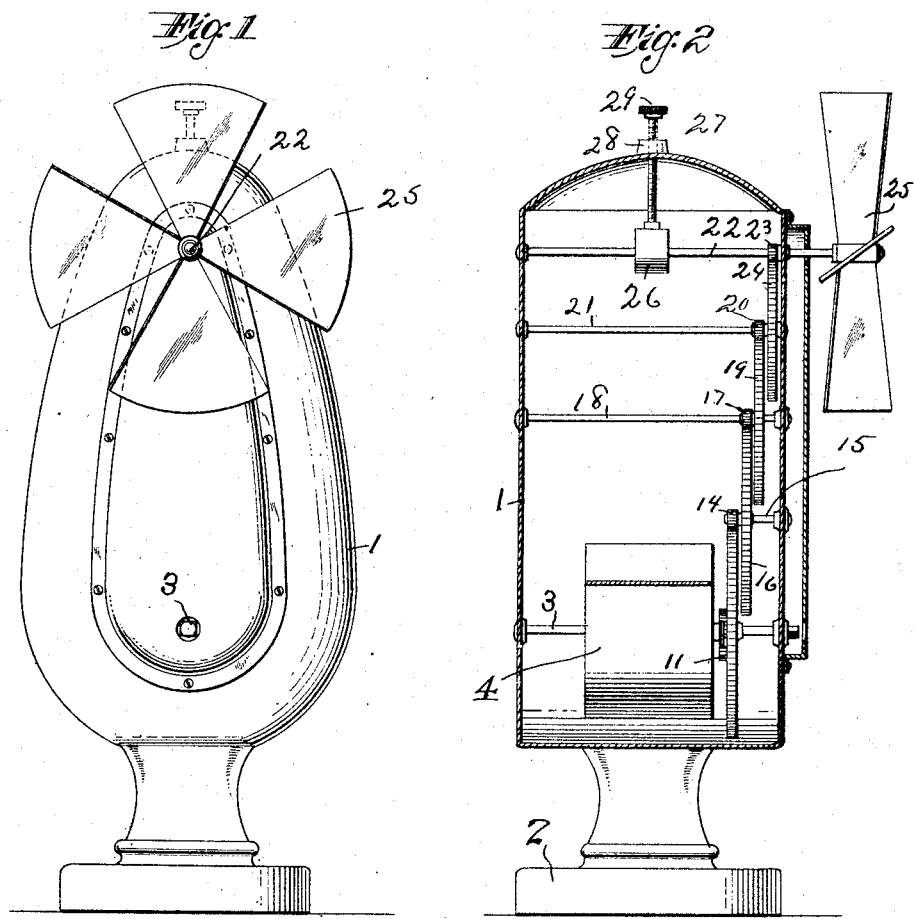

UNITED STATES PATENT OFFICE.

NEWMAN S. CHAPMAN, OF ECLECTIC, ALABAMA.

SPRING-MOTOR FAN.

1,365,455.  Specification of Letters Patent.  Patented Jan. 11, 1921.

Application filed December 19, 1919. Serial No. 346,035.

*To all whom it may concern:*

Be it known that I, NEWMAN S. CHAPMAN, a citizen of the United States, residing at Eclectic, in the county of Elmore and State of Alabama, have invented certain new and useful Improvements in Spring-Motor Fans; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fans adapted to be driven by spring power, and consists of a simple and efficient device of this nature having various details of construction, combination and arrangement of parts which will be hereinafter fully described, shown in the accompanying drawings and then specifically defined in the appended claims.

My invention is illustrated in the accompanying drawings which, with the numerals of reference marked thereon, form a part of this application, and in which:

Figure 1 is a side elevation.

Fig. 2 is a central sectional view.

Fig. 3 is an enlarged detail sectional view of the spring.

Fig. 4 is a detail view of a gear and ratchet wheel, and

Fig. 5 is an enlarged sectional view through the spring.

Reference now being had to the details of the drawings by numerals:

1 designates the casing of the motor mounted upon a suitable base 2, and 3 is a shaft journaled in the opposite walls of the casing toward the lower end thereof, one end being squared for the reception of a key whereby the shaft may be turned to wind up the spring 4.

The spring motor power comprises a series of coiled springs 5 held in radial relation with the shaft 3, as shown, and 6 are bolts which pass through tapering plates 7, and the heads of the bolts are countersunk therein, as shown in dotted lines in Fig. 3 of the drawings. Said bolts and springs are arranged in pairs, as shown clearly in Fig. 5 of the drawings, and nuts 8 are fitted to the threaded ends of said bolts.

Plates 9 have apertures therein for the reception of said bolts, and a coiled spring 10 has its inner end fastened to the shaft 3, as shown in Fig. 3 of the drawings, and is adapted to extend to the outer end of one of the coiled springs 5 and thence to be coiled about the several plates 9.

Fixed to the shaft 3 is a ratchet wheel 1, loosely mounted upon said shaft and engaged by a pawl 13, eccentrically pivoted to one of the spokes of a gear 12. The gear 12 meshes with the pinion 14 which is fixed to the shaft 15, which in turn has keyed thereto a gear 16 in mesh with a pinion 17 upon the shaft 18, and 19 is a gear fixed to the shaft 18, and meshes with the pinion 20 fixed to the shaft 21.

A shaft 22 is journaled in the opposite walls of the casing and carries a pinion 23 in mesh with the gear 24 fixed to the shaft 21. Said shaft 22 has keyed thereto a fan 25.

A friction wheel 26 is fixed to the shaft 22, and 27 is a screw mounted in a threaded aperture in the top of the casing and boss 28, and has a milled hand wheel 29 at its upper end, said screw adapted to bear yieldingly against the wheel 26 to regulate the speed of the fan.

In operation, the fan is put under tension by turning the shaft 3, causing the coiled spring 10 to wind about and compress the various coiled springs 5, and when the spring relaxes it imparts a rotary movement to the shaft 3, and through the intermeshing gears to the fan shaft, causing the fan to rotate.

What I claim to be new is:

1. A spring power fan apparatus comprising a casing having a driving shaft journaled therein, a series of coiled springs within said casing and radially disposed relative to said shaft, and a coiled spring fastened to said shaft and passing about the exterior ends of said radially disposed springs.

2. A spring power fan apparatus comprising a casing having a driving shaft journaled therein, a series of coiled springs within said casing and radially disposed with reference to said shaft, plates having concaved portions engaging said shaft, one end of said radially disposed springs bearing against said plates, bolts projecting from said plates and extending axially through said radially coiled springs, apertured plates against which the exterior ends of said radially disposed springs bear and through which said bolts pass, and a coiled spring secured to said shaft and passing about said apertured plates.

In testimony whereof I hereunto affix my signature.

NEWMAN S. CHAPMAN.